US008768396B2

(12) United States Patent
Guo et al.

(10) Patent No.: US 8,768,396 B2
(45) Date of Patent: Jul. 1, 2014

(54) METHOD AND DEVICE FOR REALIZING POWER CONTROL ON A CONTROL CHANNEL

(75) Inventors: Baojuan Guo, Beijing (CN); Xueyuan Gao, Beijing (CN)

(73) Assignee: Datang Mobile Communications Equipment Co., Ltd., Beijing (CN)

( * ) Notice: Subject to any disclaimer, the term of this patent is extended or adjusted under 35 U.S.C. 154(b) by 1037 days.

(21) Appl. No.: 12/526,077

(22) PCT Filed: Feb. 4, 2008

(86) PCT No.: PCT/CN2008/000307
§ 371 (c)(1),
(2), (4) Date: Mar. 8, 2010

(87) PCT Pub. No.: WO2008/101400
PCT Pub. Date: Aug. 28, 2008

(65) Prior Publication Data
US 2010/0179702 A1   Jul. 15, 2010

(30) Foreign Application Priority Data
Feb. 7, 2007   (CN) .......................... 2007 1 0063686

(51) Int. Cl.
*H04B 7/00* (2006.01)

(52) U.S. Cl.
USPC ......................................................... 455/522

(58) Field of Classification Search
CPC ... H04W 52/146; H04W 52/08; H04W 52/24; H04W 52/362
USPC .............................................. 455/522, 115.1
See application file for complete search history.

(56) References Cited

U.S. PATENT DOCUMENTS

2002/0021682 A1* 2/2002 Ariyoshi et al. .............. 370/335
2002/0168994 A1* 11/2002 Terry et al. ................... 455/522
2003/0022685 A1*  1/2003 Nilsson ......................... 455/522
2004/0203981 A1* 10/2004 Budka et al. .................. 455/522
2004/0229640 A1* 11/2004 Wang et al. ................... 455/522
2005/0124369 A1*  6/2005 Attar et al. .................... 455/522

(Continued)

FOREIGN PATENT DOCUMENTS

CN          1399858 A       2/2003
CN          1434593 A       8/2003

(Continued)

OTHER PUBLICATIONS

"Performance of Local Power Control in Peer-to-Peer Impulse Radio Networks with Bursty Traffic" by Kolenchery et al., IEEE, © 1997.*

(Continued)

*Primary Examiner* — Yuwen Pan
*Assistant Examiner* — Mark Woodall
(74) *Attorney, Agent, or Firm* — Barnes & Thornburg LLP

(57) ABSTRACT

A method and apparatus for realizing power control on a control channel including measuring the interval between the current control channel transmission and the last control channel transmission; comparing the measured interval with a preset threshold, and if the interval is larger than or equal to the preset threshold, carrying out the current control channel transmission by using the initial transmit power, or controlling the current control channel transmission by using the open loop power control and, otherwise, controlling the current control channel transmission by using the closed loop power control. When the control channel is an uplink control channel, it may be determined whether a compensation for path loss variance should be added based on the closed loop power control according to a related command, so as to enable that the power control can be provided effectively when the control channel transmission is discontinuous.

8 Claims, 3 Drawing Sheets

(56) References Cited

U.S. PATENT DOCUMENTS

| | | |
|---|---|---|
| 2005/0215276 A1* | 9/2005 | Koo et al. .................... 455/522 |
| 2006/0040619 A1* | 2/2006 | Cho et al. ...................... 455/69 |
| 2006/0056356 A1* | 3/2006 | Arvelo ......................... 370/332 |
| 2006/0178163 A1* | 8/2006 | Richards et al. ............. 455/522 |

FOREIGN PATENT DOCUMENTS

| | | | |
|---|---|---|---|
| CN | 1434953 A | | 8/2003 |
| EP | 1662675 A2 | | 5/2006 |
| WO | WO 01/39540 A1 | | 5/2001 |
| WO | WO 01/45258 A2 | | 6/2001 |

OTHER PUBLICATIONS

International Search Report for International Application No. PCT/CN2008/000307, dated May 22, 2008.

* cited by examiner

METHOD AND DEVICE FOR REALIZING POWER CONTROL ON A CONTROL CHANNEL

CROSS-REFERENCE TO RELATED APPLICATIONS

Priority is claimed with respect to Chinese patent application No. 200710063686.9 filed on Feb. 7, 2007, the disclosure of which is incorporated herein by reference in its entirety.

FIELD OF THE INVENTION

The present invention relates to the technical field of 3rd Generation (3G) Mobile Communications, and in particular, to a method and a device for realizing power control on a control channel.

BACKGROUND OF THE INVENTION

With the development of 3G technology, in order to meet the ever-increasing requirement of multimedia services on high-speed data transmission, 3rd Generation Partnership Project (3GPP) discloses a High Speed Downlink Packet Access (HSDPA) technology. The main object of HSDPA is to provide a guarantee of higher data transmission rate, lower time delay, higher system throughput and more powerful Quality of Service (QoS).

In the HSPDA, a High Speed-Downlink Shared Channel (HS-DSCH) is used for data transmission. The HS-DSCH is a transmission channel, and may be mapped to one or more physical channels and shared by a plurality of User Equipments (UEs) in Time Division Multiplexing mode and in Code Division Multiplexing mode. To realize rapid control on the HS-DSCH, a High Speed-Shared Control Channel (HS-SCCH) is set as a dedicated downlink control channel for the HS-DSCH to bear control information of the HS-DSCH, and a High Speed-Shared Information Channel (HS-SICH) is set as a dedicated uplink control channel for the HS-DSCH to feed back quality information of the downlink channels and a response for data blocks of downlink transmission to a NodeB. Furthermore, a Dedicated Physical Channel (DPCH) exists in the uplink channel and the downlink channel respectively, the DPCH is used for transmitting control information such as Radio Resource Control (RRC) signaling, and may also support the service transmission such as voice service and data service.

The power control function in the HSDPA is mainly embodied in the initial transmit power allocation, open loop power control and closed loop power control of the control channels such as HS-SCCH, HS-SICH, uplink DPCH and downlink DPCH. The open loop power control refers to that a UE adjusts its own transmit power by measuring the path loss variance. The closed loop power control refers to that a UE or a NodeB adjusts its own transmit power according to a Transmit Power Control (TPC) command sent by the opposite end. The initial transmit power of HS-SCCH is set by a NodeB according to the transmission capacity of the NodeB and the number of code channels occupied by the HS-SCCH, and the initial transmit power of downlink DPCH is set by a NodeB according to the transmission capacity of the NodeB and the number of code channels occupied by the downlink DPCH. The initial transmit power of HS-SICH or uplink DPCH is set according to the open loop power control.

In the prior art, a method for power control on a control channel is shown in FIG. 1, the method specifically includes a UE transmitting information on an uplink control channel according to a certain transmit power, the information being received by a NodeB after the information passes through a radio control channel. The NodeB estimates the Signal to Interference Ratio (SIR) according to the received information, compares the estimated SIR with a target value of SIR configured by a Radio Network Controller (RNC) to generate a TPC command, and the TPC command is transmitted to the UE via a downlink control channel. The UE obtains a power deviation $P_{TPC}$ that the UE needs to adjust according to the TPC command and a power control step-length configured by an RNC, compensates the current transmit power of the uplink control channel according to the $P_{TPC}$ to obtain a new transmit power. On the NodeB side, the target value of SIR may be adjusted to meet the performance requirements of the downlink control channel according to the statistical information of coding result of the uplink control channel.

The power control on the uplink control channel is carried out in the following modes.

When a UE transmits information on an uplink control channel for the first time after the UE receives information on a downlink control channel for the first time, because the received information carried in the downlink control channel is an invalid TPC command, the closed loop power control on the uplink control channel cannot be accomplished according to the invalid TPC command, the UE performs the power control on the uplink control channel transmission via the open loop power control.

After the UE receives a TPC command on the downlink control channel, the UE adjusts the transmit power of the uplink control channel correspondingly according to the TPC command and the power control step-length set by an RNC.

When the UE needs to carry out uplink control channel transmission again after the UE is subjected to one or more receiving pauses of the downlink control channels, because the effective power control on the uplink control channel cannot be implemented according to the previous TPC command, the UE controls the current uplink control channel transmission by using the open loop power control.

The main reasons that may cause a transmitting pause of the downlink control channels include: 1) multi-UE sharing may cause multi-UE time-division scheduling interval, although the HS-SCCH Cyclic Sequence Numbers (HCSNs) of the downlink control channels may be continuous, the discontinuous scheduling on the UE may cause deviation of the control on the downlink control channel, which may cause discontinuous transmission of the downlink control channel; 2) the receiving error of the downlink control channel may cause discontinuous HCSN, so that an interval may appear on the power control of uplink control channel transmission after the UE receives information on a downlink control channel correctly.

The power control on the downlink control channel is carried out in the following modes.

When a NodeB performs downlink control channel transmission for the first time, the NodeB sets the initial transmit power of the downlink control channel according to the transmission capacity of the NodeB and the number of code channels occupied by the downlink control channel, and the initial transmit power should not exceed the maximum transmit power of the downlink control channel configured by an RNC. After the downlink control channel transmission is carried out for the first time, the NodeB may control the downlink control channel by using the closed loop power control, that is, the NodeB may adjust the subsequent transmit power of the downlink control channel according to a TPC command carried in the uplink control channel that is sent by a UE. The main purpose of the setting of TPC command is to make the receiving of the downlink control channel reach a target value of Block Error Rate (BLER).

In summary, since the time-division scheduling is used for UE in the HSDPA, discontinuous transmission exists in HS-SICH, HS-SCCH, uplink DPCH and downlink DPCH for the same UE. In the prior art, the power control is performed on an uplink control channel by using open loop power control so long as discontinuous receiving appears on a downlink control channel. Correspondingly, a NodeB performs the downlink control channel transmission by using the initial transmit power so long as discontinuous downlink control channel transmission appears. Such a method cannot well utilize the control gain obtained by carrying out the power adjustment using the TPC command in the closed loop power control in a certain related time. Therefore, in the prior art, when the control channel transmission is discontinuous, the power control on the control channel cannot be effectively performed.

SUMMARY OF THE INVENTION

The invention provides a method and a device for realizing power control on a control channel, thereby eliminating that the power control cannot be effectively carried out in the prior art when the control channel transmission is discontinuous.

Accordingly, a method for realizing power control on a control channel according to an embodiment of the invention, includes:

A: measuring an interval between the current control channel transmission and the last control channel transmission;

B: comparing the interval with a preset threshold, and determining the power control mode of the current control channel transmission according to the comparison result.

Process A may further include recording a system frame number corresponding to the last control channel transmission and a system frame number corresponding to the current control channel transmission; and in process A, the interval may be the difference of the frame numbers.

In process A, the interval may be a time interval.

In process B, the determining the power control mode of the current control channel transmission according to the comparison result may include: if the interval is larger than or equal to the preset threshold, carrying out the current control channel transmission by using an open loop power control or an initial transmit power; and, otherwise, carrying out the current control channel transmission by using a closed loop power control.

When the interval is larger than or equal to the preset threshold, if the control channel is an uplink control channel, carrying out the power control on the current control channel transmission may be performed by using the open loop power control; otherwise, the current control channel transmission may be carried out by using the initial transmit power.

When the control channel is an uplink control channel and carrying out the control channel transmission is performed by using the closed loop power control, the method for power control may further include adding a compensation for path loss variance based on the closed loop power control.

The threshold may be set by a radio network controller according to correlation of radio control channel.

A device for realizing power control on a control channel according to an embodiment of the invention may include an interval measuring unit, an interval comparing unit and a power control unit, where: the interval measuring unit is configured to measure an interval between the current control channel transmission and the last control channel transmission; the interval comparing unit is configured to compare the interval with a threshold stored to obtain a comparison result; and the power control unit is configured to determine the power control mode of the current control channel transmission according to the comparison result.

The device may further include a threshold setting unit configured to dynamically adjust the threshold and input the adjustment result to the interval comparing unit, and the interval comparing unit may be configured to store the adjustment result.

The device may further include a path-loss measuring unit configured to measure path loss information of a radio channel and input a compensation for path loss variance obtained into the power control unit, and the power control unit may be configured to adjust the transmit power of the control channel according to the compensation for path loss variance.

The device may further include a path-loss-adding control unit configured to set whether the compensation for path loss variance is added based on the closed loop power control when the power control unit carries out the control channel transmission by using the closed loop power control.

In the disclosed embodiments, the power control mode of the current control channel transmission may be determined by setting a threshold of the interval between the current control channel transmission and the last control channel transmission. First, the interval between the current control channel transmission and the last control channel transmission may be measured; then, the measured interval may be compared with a preset threshold. If the interval is larger than or equal to the preset threshold, the current control channel transmission may be carried out by using an initial transmit power, or the power control may be carried out on the current control channel transmission by using the open loop power control; otherwise, the current control channel transmission may be carried out by using the closed loop power control. Specifically, when the control channel is an uplink control channel, it may be determined whether a compensation for path loss variance should be added based on the closed loop power control according to a related command. By employing the method provided by the invention, the control gain obtained by carrying out the power adjustment using a TPC command in the closed loop power control in a certain related time may be well utilized. Additionally the problem that the power control cannot be effectively carried out in the prior art when the control channel transmission is discontinuous may be eliminated; thus the performance of the control channel of HSDPA system may be improved greatly, thereby the system performance may be improved greatly.

DETAILED DESCRIPTION OF THE EMBODIMENTS

Since time-division scheduling is used for UE in an HSDPA system, using the open loop power control or the initial transmit power can guarantee the quality of the control channel when the control channel transmission is discontinuous, however, a too high transmit power may cause an interference on other control channels to lower the system performance, while a too low transmit power cannot guarantee the transmission quality of the current control channel. To guarantee the performance requirements of a control channel, the invention provides a method for power control on a control channel in the case of discontinuous scheduling.

In an embodiment of the invention, first, the interval between the current control channel transmission and the last control channel transmission is measured; then, the measured interval is compared with a preset threshold, if the interval is larger than or equal to the preset threshold, the current control channel transmission is carried out by using an initial transmit power, or the power control is carried out on the current control channel transmission by using the open loop power control; otherwise, the current control channel transmission is carried out by using the closed loop power control. Specifically, when the control channel is an uplink control channel, it may be determined whether a compensation for path loss variance should be added based on the closed loop power control according to a related command. By employing the method provided by the invention, the problem that the power control cannot be effectively carried out in the prior art when the control channel transmission is discontinuous may be eliminated, thus the system performance may be improved greatly.

The control channel according to the invention may be any discontinuous transmitting or receiving control channel, such as HS-SCCH, HS-SICH, uplink DPCH and downlink DPCH.

The main realization principle, specific embodiments and the corresponding beneficial effects of the technical solution of the invention will now be illustrated in detail with reference to the drawings.

Figure 1:
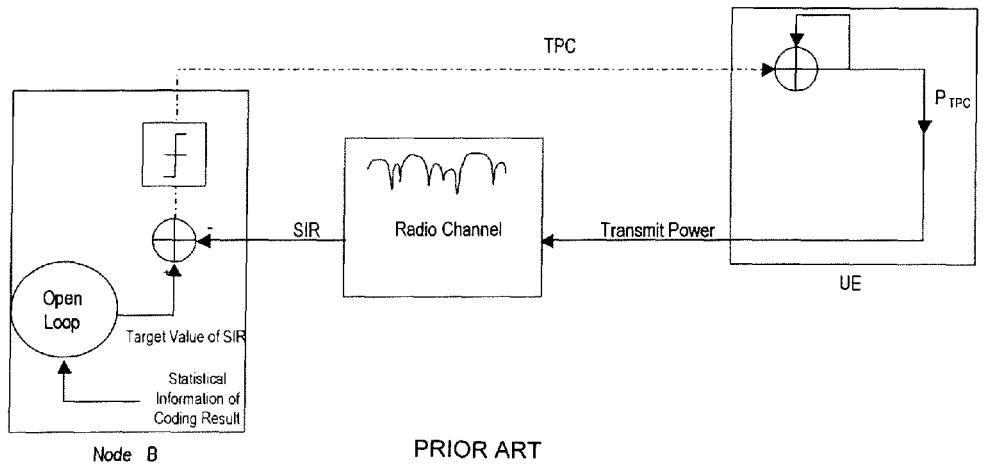
FIG. 1 is a schematic diagram showing a general procedure of power control on a control channel in the prior art.
Figure 2:
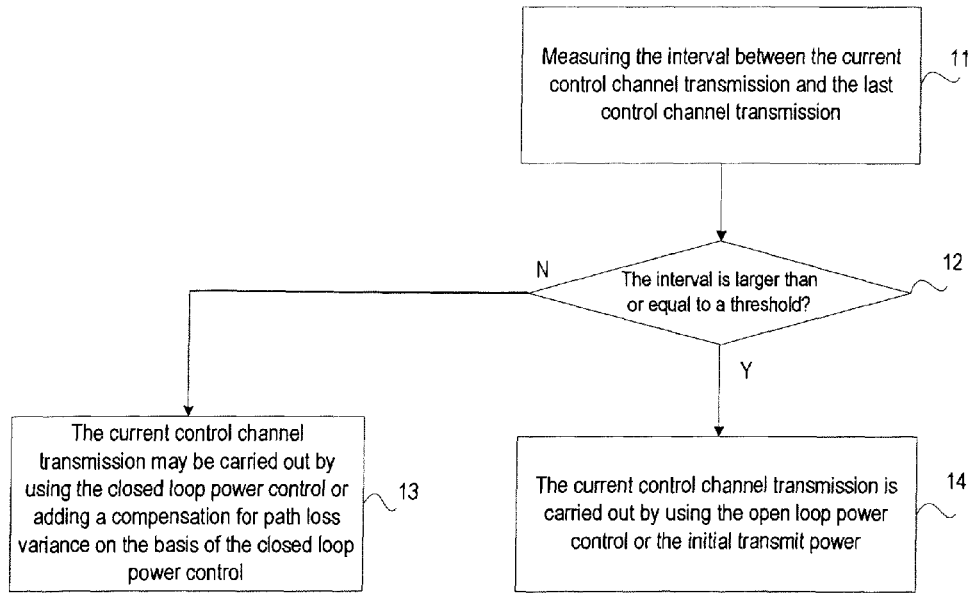
FIG. 2 is a flow chart showing the main realization principle of power control on a control channel according to an embodiment of the invention.

As shown in FIG. 2, which is a flow chart showing the main realization principle of power control on a control channel according to an embodiment of the invention, the main realization procedure of which is as follows.

Process 11: the interval between the current control channel transmission and the last control channel transmission is measured and stored. The interval may be measured in various modes. For example, the system allocates a system frame number corresponding to each control channel transmission, the system frame number corresponding to the current control channel transmission is compared with the system frame number corresponding to the last control channel transmission to obtain the difference of the system frame numbers of said two control channel transmissions. Because the system frame length is knowable, the difference of the system frame numbers may be converted into a time value, that is, the difference of the system frame numbers is the interval between said two control channel transmissions. Specifically, the time interval between the current control channel transmission and the last control channel transmission may also be measured via a timer.

Process 12: the measured interval between the current control channel transmission and the last control channel transmission is compared with a preset threshold, if the interval is larger than or equal to the preset threshold, it turns to Process 14; otherwise, it turns to Process 13.

The preset threshold herein may be set with reference to the correlation of practical radio control channel and adjusted dynamically as required. When the interval is obtained by measuring the difference of the system frame numbers in Process 11, the value of the threshold may be in the range of 1 to 255 subframes, for example, the threshold may be set as 16 subframes.

Process 13: when the measured interval is less than the preset threshold, which indicates that a good correlation of the control channel still exists between the current control channel transmission and the last control channel transmission, thus the current control channel transmission may be carried out by using the closed loop power control or adding a compensation for path loss variance based on the closed loop power control.

Specifically, the path loss variance may be determined by measuring the power information of a broadcast channel that is received via a UE. The specific procedure is as follows: the UE subtracts the path loss value measured previously from the path loss value measured currently to obtain the path loss variance, and obtains the compensation information for path loss variance of the current control channel transmission according to the path loss variance. It is determined by an RNC whether the compensation for path loss variance should be added based on the closed loop power control.

Process 14: when the measured interval is larger than or equal to the preset threshold, which indicates that a very small correlation of the radio control channel exists between the current control channel transmission and the last control channel transmission. Therefore, to guarantee the quality of the control channel, the current control channel transmission is carried out by using the open loop power control or the initial transmit power.

Specifically, when the control channel is an uplink control channel, the current control channel transmission is carried out by using the open loop power control; when the control channel is a downlink control channel, the current control channel transmission is carried out by using the initial transmit power.

The realization principle of the invention will now be illustrated in detail by taking its applications in HS-SICH and HS-SCCH as an example.

When the control channel is an HS-SICH, each of the processes corresponding to the main realization principle of the invention is as follows.

In Process 11, when the UE transmits information on the HS-SICH each time, it records the system frame number corresponding to the current transmission. When the UE transmits the information on the HS-SICH, it compares the system frame number corresponding to the current HS-SICH transmission with the system frame number corresponding to the last HS-SICH transmission to obtain the difference of the system frame numbers between said two transmissions. Because the system frame length is knowable, the difference of the system frame numbers may be converted into a time value, that is, the difference of the system frame numbers is the interval between said two transmissions.

The UE may also measure the interval between the current HS-SICH transmission and the last HS-SICH transmission via a timer.

Specifically, when the UE transmits the information on the HS-SICH for the first time after it receives information on an HS-SCCH for the first time, because there exists no previous HS-SICH transmission and the received TPC command carried in the HS-SCCH for the first time is invalid, the closed loop power control cannot be carried out on the current HS-SICH transmission according to the invalid TPC command, thus the current HS-SICH transmission is carried out by using the open loop power control.

In Process 12, the measured interval between the current HS-SICH transmission and the last HS-SICH transmission is compared with a preset threshold, if the interval is larger than or equal to the preset threshold, it turns to Process 14; otherwise, it turns to Process 13.

The preset threshold herein is set by an RNC with reference to the correlation of the practical radio control channel. When the interval is obtained by measuring the difference of the system frame numbers in Process 11, the value of the threshold may be in the range of 1 to 255 subframes, and the preset threshold may be adjusted dynamically as required.

In Process 13, when the measured interval is less than the preset threshold, which indicates that a good correlation of the control channel still exists between the current HS-SICH transmission and the last HS-SICH transmission. Therefore, the power control on the current transmission is carried out according to a TPC command carried in the HS-SCCH received previously, and the current HS-SICH transmission may be carried out by using the closed loop power control or adding a compensation for path loss variance based on the closed loop power control.

Specifically, it is determined by an RNC whether the compensation for path loss variance should be added based on the closed loop power control, and it may be adjusted according to practical requirements.

In Process 14, when the measured interval is larger than or equal to the preset threshold, which indicates that a very small correlation of the radio control channel exists between the current HS-SICH transmission and the last HS-SICH transmission. Therefore, to guarantee the quality of the control channel, the current HS-SICH transmission is carried out by using the open loop power control, that is, the transmit power is adjusted by measuring the path loss variance.

Correspondingly, when the control channel is an HS-SCCH, each of the processes corresponding to the main realization principle of the invention is as follows.

In Process 11, the NodeB compares the system frame number corresponding to the current HS-SCCH transmission with the system frame number corresponding to the last HS-SCCH transmission to obtain the difference of the system frame numbers between said two transmissions. Because the system frame length is knowable, the difference of the system frame numbers is the interval between said two transmissions.

The NodeB may also measure the interval between the current HS-SCCH transmission and the last HS-SCCH transmission via a timer.

Specifically, when the NodeB transmits information on the HS-SCCH for the first time, because there exists no previous HS-SCCH transmission, the current HS-SCCH transmission is carried out by using the initial transmit power. The initial transmit power herein is determined by the NodeB according to the transmission capacity of the NodeB and the number of code channels occupied by the HS-SCCH based on a certain power allocation principle.

In Process 12, the measured interval is compared with a preset threshold, if the interval is larger than or equal to the preset threshold, it turns to Process 14; otherwise, it turns to Process 13.

The preset threshold herein is set by an RNC with reference to the correlation of the practical radio control channel and may be adjusted dynamically as required. When the interval is obtained by measuring the difference of the system frame numbers in Process 11, the value of the threshold may be in the range of 1 to 255 subframes.

In Process 13, when the measured interval is less than the preset threshold, which indicates that a good correlation of the control channel still exists between the current HS-SCCH transmission and the last HS-SCCH transmission. Therefore, the current HS-SCCH transmission may be carried out by using the closed loop power control, that is, the power control on the current HS-SCCH transmission may be carried out according to a TPC command carried in the HS-SICH that is received lately, in combination with the power control step-length provided by the RNC.

In process 14, when the interval is larger than or equal to the preset threshold, which indicates that a very small correlation of the radio control channel exists between the current HS-SCCH transmission and the last HS-SCCH transmission. Therefore, to guarantee the quality of the control channel, the current HS-SCCH transmission is carried out by using the initial transmit power.

The main realization principle, the specific embodiments and the corresponding beneficial effects attained of the technical solution provided by the invention during the power control procedure on the HS-SCCH and the HS-SICH are the same as those of the above solution applied during the power control procedure on the uplink DPCH and downlink DPCH, so they will not be described again here.

Figure 3:
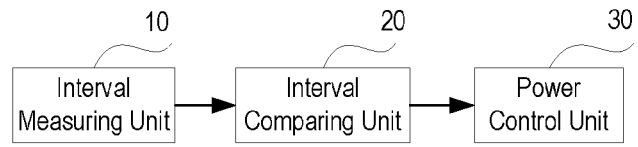
FIG. 3 is a structural schematic diagram showing the related components of a device according to an embodiment of the invention.

Correspondingly, the invention further provides a device for realizing power control on a control channel, as shown in FIG. 3, the device is mainly consisted of an interval measuring unit 10, an interval comparing unit 20 and a power control unit 30. The main role of each unit is as follows.

The interval measuring unit 10 is configured to measure an interval between the current control channel transmission and the last control channel transmission and output the interval to the interval comparing unit 20.

Specifically, the interval may be determined by measuring the difference between the system frame number corresponding to the last control channel transmission and the system frame number corresponding to the current control channel transmission or via a timer.

The interval comparing unit 20 is configured to compare the received interval with a threshold stored and output a comparison result to the power control unit 30.

The power control unit 30 is configured to determine the power control mode of the current control channel transmission according to the received comparison result. If the measured interval is larger than or equal to the preset threshold, the current control channel transmission is carried out by using the open loop power control; otherwise, the current control channel transmission is carried out by using the closed loop power control.

The device provided by the invention for realizing power control on an uplink control channel may be applied in a UE or any other equipment related to the power control on a control channel; and the device for realizing power control on a downlink control channel may be applied in a NodeB or any other equipment related to the power control on a control channel.

Figure 4:
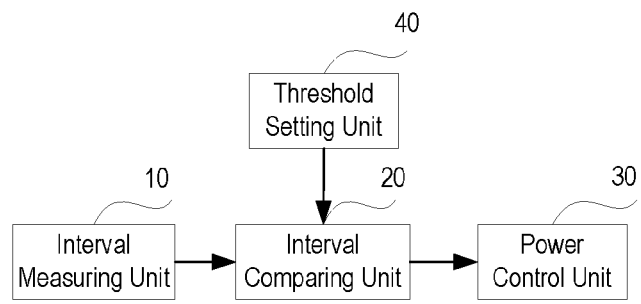
FIG. 4 is a structural schematic diagram showing the related components of a device according to an embodiment of the invention.

In an embodiment of the invention, as shown in FIG. 4, the device of the invention may further include a threshold setting unit 40 configured to set and adjust the threshold and input the setting result to the interval comparing unit 20, and the interval comparing unit 20 stores the setting result of the threshold.

Specifically, the threshold setting unit 40 may be applied in an RNC or any other equipment related to the power control on a control channel. The threshold setting unit 40 may autonomously adjust the preset threshold according to the requirements of the practical system and environment and the correlation of the radio control channel or according to an input operation of a system administrator to obtain a better setting effect of the threshold.

Figure 5:
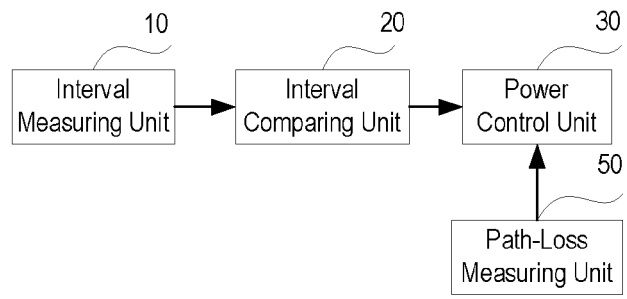
FIG. 5 is structural schematic diagram showing the related components of a device applied during the power control on an uplink control channel according to an embodiment of the invention.

In an embodiment of the invention, as shown in FIG. 5, when the device of the invention is applied in the power control on an uplink control channel, the device may further include a path-loss measuring unit 50 configured to measure path loss variance of a radio channel and output compensation information for path loss variance to the power control unit 30, and the power control unit 30 adds the compensation for path loss variance based on the closed loop power control when the control channel transmission is carried out by using the closed loop power control.

Specifically, the path-loss measuring unit 50 may measure the path loss variance according to the transmit power carried in a system broadcast channel and the receive power measured according to a system broadcast signal. The path-loss measuring unit 50 may be applied in a UE or any other equipment related to the power control on an uplink control channel.

Figure 6:
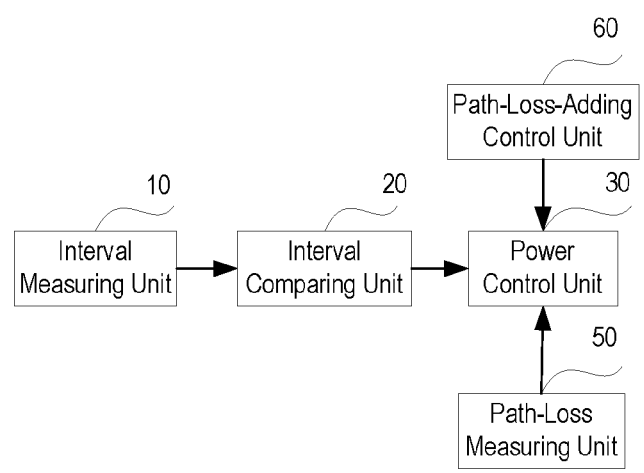
FIG. 6 is a structural schematic diagram showing the related components of a device applied during the power control on an uplink control channel according to an embodiment of the invention.

In an embodiment of the invention, the device in FIG. 5 may further include a path-loss-adding control unit 60, as shown in FIG. 6. The path-loss-adding control unit 60 is configured to set whether the power control unit 30 is allowed to add the compensation for path loss variance based on the closed loop power control when the power control unit 30 carries out the control channel transmission by using the closed loop power control, and output the setting result to the power control unit 30. The power control unit 30 determines whether the compensation for path loss variance should be added based on the closed loop power control according to the received setting result.

Specifically, the path-loss-adding control unit may be applied in an RNC or any other equipment related to the power control on an uplink control channel.

Based on the device shown in FIG. 3, the auxiliary units attached in FIG. 4-6 may be combined with each other to obtain a device for power control on a control channel that has more overall functions.

It will be appreciated that one skilled in the art may make various modifications and alterations to the present invention without departing from the spirit and scope of the present invention. Accordingly, if these modifications and alterations to the present invention fall within the scope of the claims of the present invention and their equivalents, the present invention intends to include all these modifications and alterations.

The invention claimed is:

1. A method for realizing power control on a control channel, transmission of which is discontinuous resulting in a discontinuously transmitted control channel, the method comprising:
   measuring an interval between a current transmission of the discontinuously transmitted control channel and a last transmission of the discontinuously transmitted control channel, wherein, the interval is a time interval;
   comparing the time interval with a preset threshold to produce a comparison result, wherein the preset threshold is set by a radio network controller based on radio control channel correlation; and
   determining a power control mode of the current transmission of the discontinuously transmitted control channel based on the comparison result,
   wherein the determining of the power control mode of the current transmission of the discontinuously transmitted control channel based on the comparison result comprises:
      carrying out the current transmission of the discontinuously transmitted control channel using an open loop power control or an initial transmission power if the time interval is larger than or equal to the preset threshold; and
      otherwise, carrying out the current transmission of the discontinuously transmitted control channel using a closed loop power control, and
   wherein the use of the open loop power control or the initial transmission power for the current transmission of the discontinuously transmitted control channel when the time interval is larger than or equal to the preset threshold ensures that a transmission power of the discontinuously transmitted control channel is set high enough to guarantee quality of the discontinuously transmitted control channel but also that the transmission power of the discontinuously transmitted control channel is set low enough not to interfere with other control channels.

2. The method of claim 1, wherein, the measuring of the time interval between the current transmission of the discontinuously transmitted control channel and the last transmission of the discontinuously transmitted control channel comprises recording a system frame number corresponding to the last transmission of the discontinuously transmitted control channel and a system frame number corresponding to the current transmission of the discontinuously transmitted control channel.

3. The method of claim 1, wherein the control channel is an uplink control channel.

4. The method of claim 1, wherein, when the control channel is an uplink control channel and the discontinuously transmitted control channel transmission is performed using the closed loop power control, the method control further comprises adding a compensation for path loss variance based on the closed loop power control.

5. A device for realizing power control on a control channel, transmission of which is discontinuous resulting in a discontinuously transmitted control channel, the device comprising:
   an interval measuring unit, an interval comparing unit and a power control unit, wherein:
      the interval measuring unit measures an interval between the current control channel transmission and the last control channel transmission, wherein, the interval is a time interval;
      the interval comparing unit compares the time interval with a stored preset threshold to obtain a comparison result, wherein the preset threshold is set by a radio network controller based on a radio control channel correlation; and
      the power control unit determines a power control mode of the current transmission of the discontinuously transmitted control channel based on the comparison result, wherein the power control unit:
         carrying out the current transmission of the discontinuously transmitted control channel using an open loop power control or an initial transmission power if the time interval is larger than or equal to the preset threshold; and
         otherwise, carrying out the current transmission of the discontinuously transmitted control channel using a closed loop power control, and wherein the use of the open loop power control or the initial transmission power for the current transmission of the discontinuously transmitted control channel when the time interval is larger than or equal to the preset threshold ensures that a transmission power of the discontinuously transmitted control channel is set high enough to guarantee quality of the discontinuously transmitted control channel but also that the transmission power of the discontinuously transmitted control channel is set low enough not to interfere with other control channels.

6. The device of claim 5, further comprising a threshold setting unit that dynamically adjusts the threshold and inputs an adjustment result to the interval comparing unit,
  wherein the interval comparing unit stores the adjustment result.

7. The device of claim 5, further comprising a path-loss measuring unit that measures path loss information of a radio channel and inputs a compensation for path loss variance into the power control unit,
  wherein the power control unit adjusts the transmit power of the discontinuously transmitted control channel based on the compensation for path loss variance.

8. The device of claim 7, further comprising a path-loss adding control unit that sets whether the compensation for path loss variance is input into the power control unit based on the closed loop power control when the power control unit carries out the discontinuously transmitted control channel transmission using the closed loop power control.

* * * * *